May 31, 1949.   T. H. CLARK   2,471,412
FREQUENCY CONTROLLED DIRECTION FINDER
Filed Oct. 10, 1945
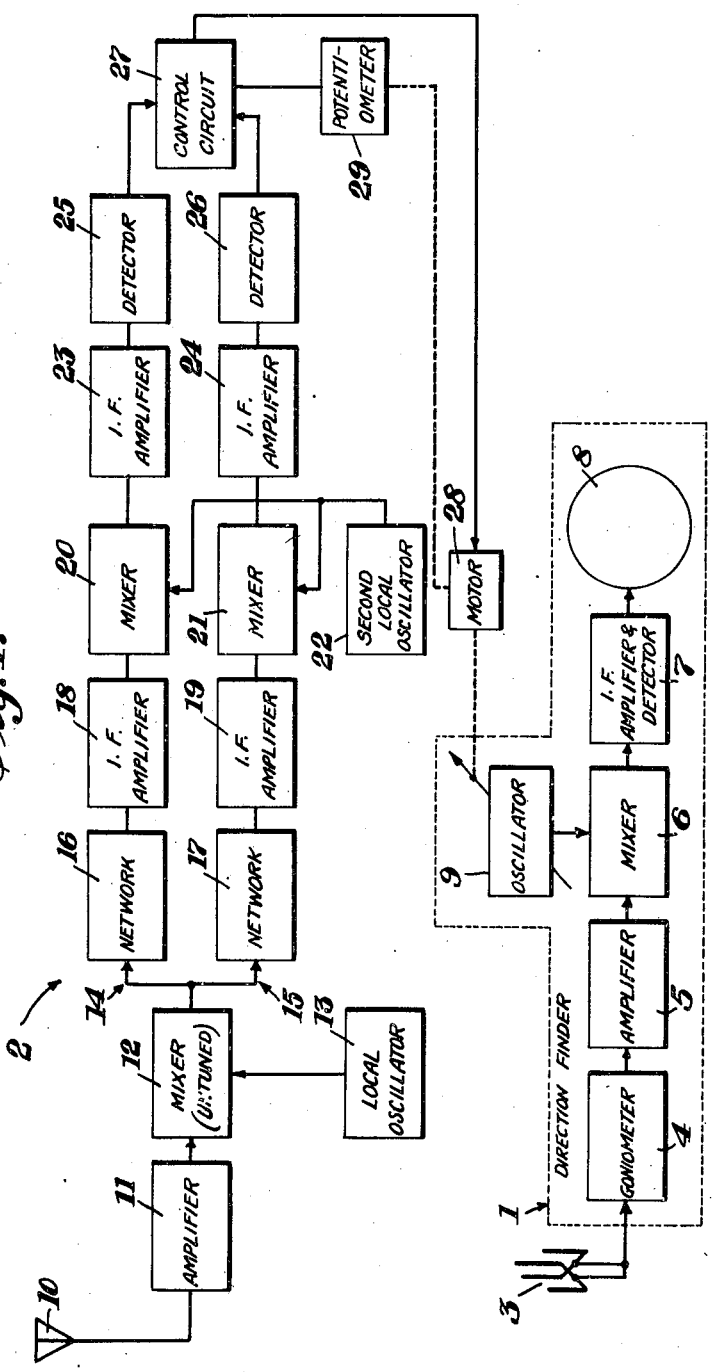
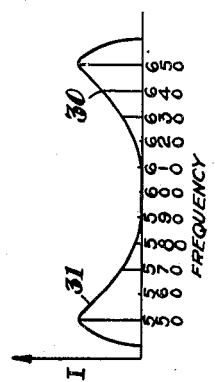
INVENTOR.
TREVOR H. CLARK
BY
*Percy P. Lantz*
ATTORNEY

UNITED STATES PATENT OFFICE 2,471,412

FREQUENCY CONTROLLED DIRECTION FINDER

Trevor H. Clark, Boonton, N. J., assignor to Federal Telephone and Radio Corporation, New York, N. Y., a corporation of Delaware Application October 10, 1945, Serial No. 621,577

1 Claim. (Cl. 343—113)

This invention relates to radio receivers, particularly direction finding receivers, which are automatically tuned, for example, for the reception of signals whose carrier frequency is being varied.

In certain instances, a transmitted signal is varied in frequency and it is necessary for the receiver to follow said frequency variations in order to receive the signal. For example, in certain types of radar systems, usually referred to as "protected radar," the frequency of the transmitter and receiver are simultaneously varied. In attempting to locate the transmitter of such signals, it becomes necessary to follow the varying frequency of the transmitted radar pulses.

An object of the present invention is the provision of an improved radio receiver adapted to be automatically tuned to an incoming signal.

Another object of the present invention is the provision of an improved receiver adapted to automatically follow a signal whose carrier frequency is being varied.

Another object of the present invention is the provision of a direction finder adapted to determine direction on a signal whose carrier frequency is being varied.

Other and further objects of the present invention will become apparent and the invention will be best understood from the following description of an embodiment thereof, reference being had to the drawings, in which:

Fig. 1 is a block diagram of a direction finding system embodying my invention; and Fig. 2 is a set of curves used in explaining the operation of the system of Fig. 1.

Referring now to Fig. 1, a radio receiver in the form of a direction finder, generally designated by the numeral 1, of conventional construction is adapted to be automatically tuned, as for example in following radar or other signal energy whose carrier frequency is varying, by means of a control system, generally designated by the numeral 2, which controls the tuning of the direction finder. The direction finder, for example, may have a conventional array 3, feeding a goniometer 4, and radio frequency amplifier 5, whose output in turn is fed to a mixer 6, the output of the mixer 6 being in turn fed through the usual intermediate frequency amplifier and detector 7, to a suitable indicator 8, such as a cathode ray oscillograph tube. Tuning of the direction finder 1 is accomplished by varying the frequency of the local oscillation fed to the mixer 6 from a variable local oscillator 9.

The control system 2 is preferably provided with a broad band omni-directional antenna system 10 feeding a broad band radio frequency amplifier 11 whose output is then fed to a mixer 12. It is to be noted that while the antenna system of the direction finder is directional and receives energy in a non-uniform pattern from various directions, antenna system 10 on the other hand is omni-directional, and will pick up the transmitted signal uniformly whatever its direction. Furthermore, while the direction finder at any given setting of oscillator 9, will only pick up energy over a relatively narrow band of frequencies, the amplifier 11 of the control system 2 is preferably untuned or so broadly tuned that it is capable of picking up signal energy varying over a relatively broad band of frequencies without requiring any tuning adjustment of said amplifier 11. Consequently if any signal is being transmitted which is within the broad frequency band covered by amplifier 11, it will be picked up and fed to mixer 12. The mixer 12 is preferably untuned. A local oscillator 13 supplies energy to the mixer 12 which is mixed with the signal energy picked up by the broad band antenna 10.

The output of the mixer 12 is separated in two separate channels 14 and 15 respectively. In channels 14 and 15 are two series type four terminal networks 16 and 17 respectively, network 16 being resonant at a frequency higher than the frequency of network 17 and said networks both having asymmetrical resonance characteristics with respect to frequency, as will be explained in greater detail hereinafter, so that as the frequency of the incoming signal varies from a given center frequency, the attenuation produced in one of the networks will increase while the attenuation produced in the other network will decrease. Consequently the voltage output of networks 16 and 17 will vary with respect to each other depending on the frequency of the incoming signal. The output of the networks 16 and 17 may then be fed through symmetrical channels including intermediate frequency amplifiers 18 and 19 respectively and mixers 20 and 21 respectively in which the energy from said networks 16 and 17 respectively, are mixed with energy from another local oscillator 22. The output energy from mixers 20 and 21 pass through intermediate frequency amplifiers 23 and 24, and detectors 25 and 26 respectively, to a balanced control circuit 27. In control circuit 27 the energies derived from channels 14 and 15 are compared and in accordance with the relative values of these energies, the control circuit 27 operates a follow-up motor circuit 28 which changes the frequency of the local oscillator 9 in accordance with the relative value of these energies. The local oscillator 9 is always tuned so that the output of mixer 6 is always at the predetermined intermediate frequency at which the I. F. amplifier 7 is set. Thus the direction finder 1 is always tuned to the frequency of the last pulse received. The control circuit 27 is readjusted to balance after motor 28 has been turned the amount required to tune oscillator 9 to the frequency of the last pulse received. This may be accomplished by having motor 28, as it rotates, drive a potentiometer 29, which potentiometer 29 in turn moves in a direction to balance the voltages in the control circuit.

The operation of the system heretofore described may be readily understood by applying to the elements thereof arbitrary values, it being understood that the values selected are used solely for the purposes of illustration. If the carrier frequencies of the incoming pulses are designated as $F_1$ and the frequency of the local oscillator is designated as $F_2$, then at the output of mixer 12 energy may be derived equal to $F_1+F_2$ and $F_1-F_2$, with the $F_1+F_2$ energy being passed through channel 14 while the $F_1-F_2$ energy is passed through channels 15. It is preferable that the $F_2$ frequency be very much less than the $F_1$ frequency. Assuming that in a given instance $F_1$ is equal to 600 megacycles, the local oscillator 13 output ($F_2$) may be 30 megacycles. The output of mixer 12 will then consist of energy of frequencies of 630 megacycles and 570 megacycles, and due to the selective characteristics of networks 16 and 17 the 630 megacycle energy passes through channel 14 and the 570 megacycle energy passes through channel 15. The resonance characteristics of networks 16 and 17 are represented in curves 30 and 31 of Fig. 2, which curves are both asymmetrical. These two curves are also symmetrically spaced from the center frequency of 600 megacycles, which latter frequency is the frequency around which the frequency of the incoming pulses vary. Networks 16 and 17 are resonant at frequencies 650 and 550 respectively. It will be seen from the curves that with frequencies of 570 and 630 megacycles passing through networks 17 and 16 respectively, the current output of these networks will be equal. As stated before, frequencies of 570 and 630 megacycles result when $F_1$ is 600 and $F_2$ is 30. Under these conditions, the output of channels 14 and 15 will be equal and the control circuit 27 through operation of the motor 28 will maintain oscillator 9 at the center of its operating frequency range, at which setting the direction finder 1 is tuned to receive energy of 600 megacycle carrier frequency.

Assuming, however, that the next incoming pulse has a carrier frequency of 610 megacycles, the output of mixer 12 will be 640 and 580 megacycles, which will pass through networks 16 and 17 respectively. It will be seen from the curves of Fig. 2 that network 16 will pass more current at 640 megacycles than network 17 will pass at 580 megacycles. Consequently the output of channel 14 will be greater than the output of channel 15. This unbalance will cause control circuit 27 to operate motor 28 in one direction to tune oscillator 9 to thereby vary the tuning of direction finder 1 so that it will be tuned to receive 610 megacycle pulses. Oscillator 9 having been tuned to this new frequency will remain there until motor 28 is again actuated. If the next incoming pulse has a carrier frequency of 590 megacycles, an unbalance will result but in a direction opposite to that indicated above and motor 28 will tune oscillator 9 in an opposite direction too.

Thus it will be seen that as the carrier frequency of the input pulses vary from the center frequency 600, an unbalance is produced in channels 14 and 15, which actuates control circuit 27 and retunes oscillator 9 so that the direction finder is always tuned to the carrier frequency of the last pulse received.

Mixers 20 and 21 and the second local oscillator 22 in the control system 2 serve to beat down the frequency output of the intermediate frequency amplifiers 18 and 19 so that maximum amplification can be obtained in intermediate frequency amplifiers 23 and 24, respectively.

While I have hereinabove described the system for covering a specific range of frequencies, it will be obvious that, by suitable selection of the values of the components of the system, the range may be widened or narrowed, or shifted to another portion of the frequency spectrum.

While I have described above the principles of my invention in connection with specific apparatus, it is to be clearly understood that this description is made only by way of example and not as a limitation on the scope of my invention as defined in the accompanying claim.

I claim:

In combination, a direction finding receiver for the reception of signals, whose carrier frequency is being varied having an antenna array, a goniometer supplied from said array, a converter stage for said receiver including an oscillator having motor controlled frequency adjusting means, a direction indicating means deriving signal energy from said converter; a control receiver including a converter stage and a local fixed frequency oscillator therefor providing sum and difference side band energy output of the received signal energy and said local oscillator energy frequencies, two channels connected to be supplied from said last named converter stage, one of said channels being tuned to pass the side band of the sum and the other channel the side band of the difference, said channels having asymmetrical resonance characteristics, symmetrical signal translating means for said channels means, a balanced control circuit for said channels, and motor means for controlling the tuning of said first named oscillator controlled from said control circuit.

TREVOR H. CLARK.

REFERENCES CITED

The following references are of record in the file of this patent:

UNITED STATES PATENTS

| Number | Name | Date |
|---|---|---|
| 2,175,320 | Runge | Oct. 10, 1939 |
| 2,193,843 | Robinson | Mar. 19, 1940 |
| 2,211,750 | Humby | Aug. 20, 1940 |

FOREIGN PATENTS

| Number | Country | Date |
|---|---|---|
| 474,771 | Great Britain | Nov. 8, 1937 |